Nov. 18, 1952  R. P. EVANS  2,618,199
PRISMATIC OPTICAL VIEWING DEVICE
Filed Nov. 22, 1950  2 SHEETS—SHEET 1
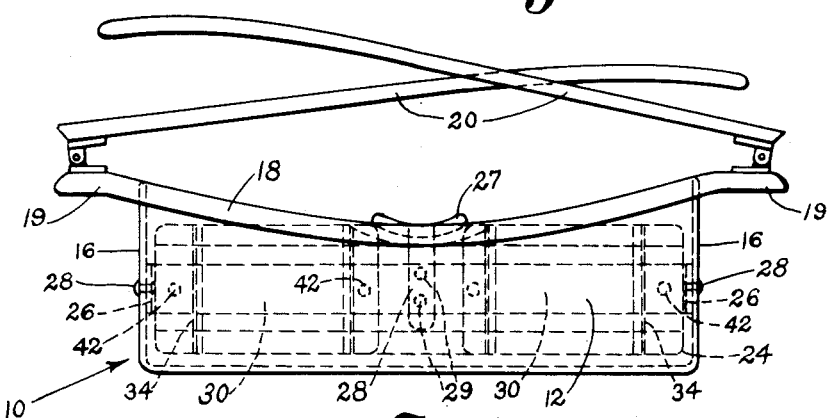
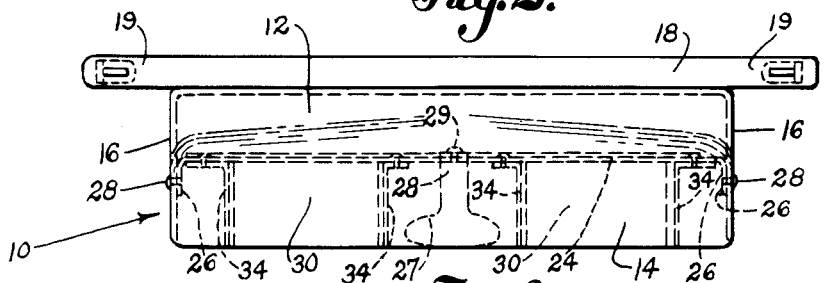
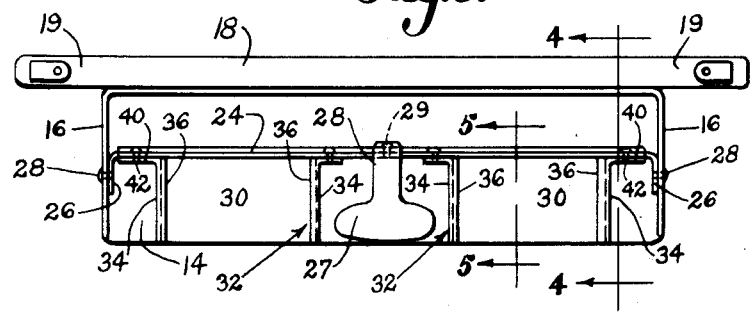
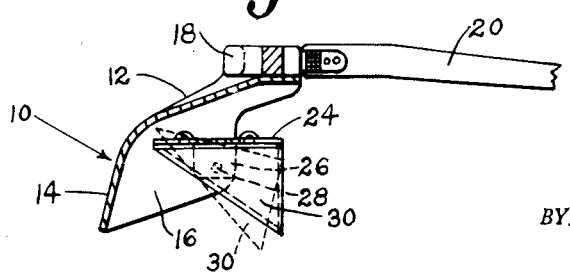
INVENTOR.
Robert P. Evans
BY Harold E. Cole
Attorney Nov. 18, 1952 R. P. EVANS 2,618,199
PRISMATIC OPTICAL VIEWING DEVICE
Filed Nov. 22, 1950 2 SHEETS—SHEET 2
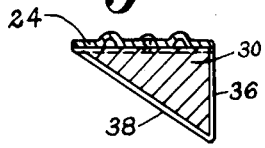
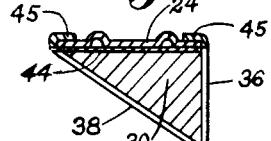
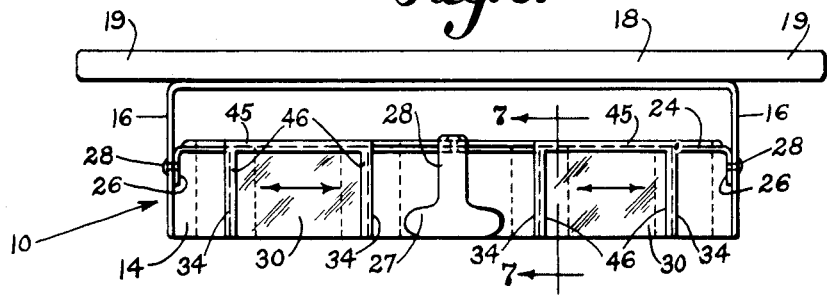
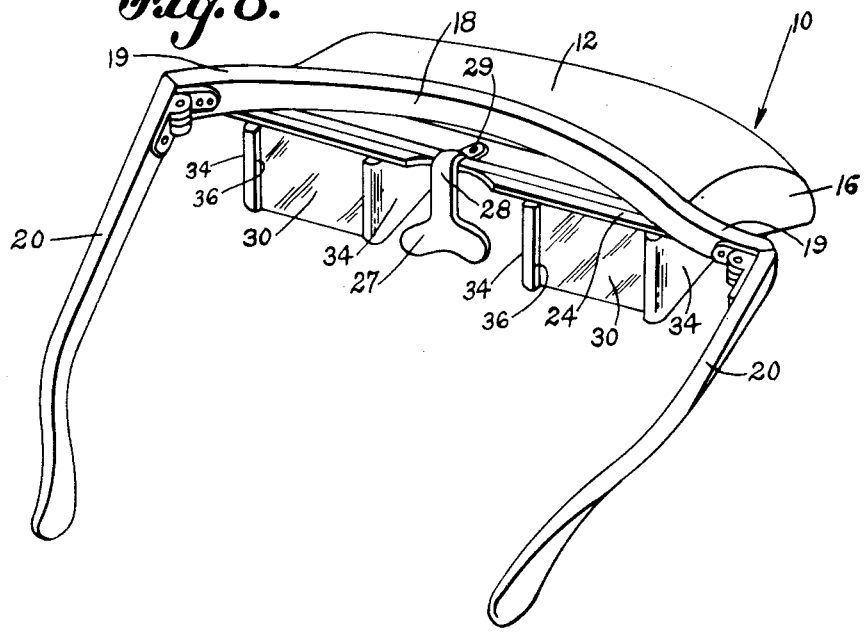
INVENTOR.
Robert P. Evans
BY Harold E. Cole
Attorney Patented Nov. 18, 1952

2,618,199

UNITED STATES PATENT OFFICE 2,618,199

PRISMATIC OPTICAL VIEWING DEVICE

Robert P. Evans, Westwood, Mass., assignor to Visual Research Incorporated, Boston, Mass., a corporation Application November 22, 1950, Serial No. 197,143

8 Claims. (Cl. 88—41)

This invention relates to an optical device that enables one to view objects at a substantial angle to the line of vision.

One object is to provide such a device that is exceedingly simple in construction and is made of relatively few parts that are easy to assemble.

Another object is to provide such a device that is compact, is attractive in appearance and feels comfortable when worn.

A further object is to provide such a device with a nose piece that serves to accurately position my device on the wearer.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a top plan view of my optical device, Figure 2 is a front elevational view thereof, omitting the bows, and Figure 3 is a rear elevational view thereof, omitting the bows.

Figure 4 is a sectional view taken on the line 4—4 of Figure 3, and Figure 5 is a sectional view taken on the line 5—5 of Figure 3.

Figure 6 is a rear elevational view, omitting the bows, of a modified form of my optical device with adjustable prisms.

Figure 7 is a sectional view taken on the line 7—7 of Figure 6.

Figure 8 is a perspective view of the optical device shown in said Figure 1.

As illustrated, my optical device has outer supporting means which, as shown, includes a visor or shield 10 formed with a top wall 12, a front wall 14 continuing therefrom, and two side walls 16, all of which are preferably integral to provide an overall construction. It may be made of a single piece of opaque metal or of plastic or the like and is open at the bottom and at the rear. Extending across the rear of and slightly beyond said top 12, is a bow support 18 which may be integral with or attached to said top wall 12. From the extension portions 19 of said bow support 18 the usual eyeglass bows or temples 20 are hingedly connected as at 22.

Interiorly of the top wall 12 and front wall 14 of said visor 10, and spaced below the said top wall 12, is a mounting 24 in the form of a thin plate, oblong-shaped, which has angularly extending ears 26 at each side. Rivets 28 attachably extend through said visor sides 16 and said ears 26, and, if desired, this attachment may permit a pivotal movement of said mounting 24 relative to the visor.

A nose piece or bridge 27 has an angular attaching finger 28 which rests on top of said mounting, being attached thereto by rivets 29. This nose piece 27 extends rearwardly of other parts of my device, and is formed of material, such as metal, that can be bent.

There are two 3-faced optical prisms 30, which are unequal-sided, and well known. They are directly under said mounting 24 and spaced laterally apart at opposite sides of said nose piece. The top surface of each prism is silvered in the usual way and the two outer side surfaces are ground to a dull finish to obstruct the passage of light through them.

A retainer 32 at each side of a said prism 30 includes a cover plate 34 that covers a side of said prism 30 and extending angularly therefrom is a flange 36 that extends over and embraces the rear edge and another flange 38 that extends over and embraces a bottom edge of said prism 30. Said retainer 32 also has an attaching wing 40 extending angularly upward from said cover plate 34 and parallel with said mounting or plate 24, being attached to the latter by a rivet 42. Thus a prism 30 has both sides covered by said plates 34.

My device could be furnished with one prism 30 only, if desired, as if a person had sight in but one eye, but in this event the general construction would be the same.

In Figures 6 and 7 of the drawings a modification is shown, that permits adjustment of the positions of said prisms 30 along said mounting 24. Said retainer cover plate 34 and bottom edge flange 38 are used as described; but said rear edge flange 36 is omitted as is said attaching wing 40. Extending laterally from opposite said cover plates 34 is an integral top plate 44 from which flanges 45 extend upwardly and over the front and rear top edges of each said prism. Said flanges 45 are rounded over onto said edges of said mounting plate 24, being slidably mounted on the latter whereby said prism 30 and its retainers, slide as a unit on said mounting 32. Thus adjustment of the positions laterally of said prisms 30 may be made. Extending slightly rearward of each said cover plate 34 are flanges 46 which are turned inwardly slightly at opposite sides onto the rear face surface of each said prism 30 to help retain the latter in place.

What I claim is:

1. An optical viewing device for diverting the direct vision field for personal attachment to the head of the wearer, comprising a visor embodying a top wall and a front wall and being open at the bottom and at the rear, a 3-faced, reflecting prism of transparent material directly below said visor top wall and directly rearward of said visor front wall, the entrance face of said prism being directed generally to said open bottom and the exit face being directed generally to said open rear, said visor shielding said prism from external light at the top and front, and two opaque retainer cover plates attached to and covering the opposite sides of said prism, and means attaching said cover plates to said visor.

2. An optical viewing device for diverting the direct vision field for personal attachment to the head of the wearer, comprising a visor embodying a top wall and a front wall and being open at the bottom, a 3-faced, reflecting prism of transparent material directly below said visor top wall and directly rearward of said visor front wall, said visor shielding said prism from external light at the top and front, and opaque retainer cover plates attached to and covering the opposite sides of said prism, a mounting under and adjacent said top wall, means attaching said cover plates and mounting to said visor, and a nose piece attached to and extending below said mounting and being intermediate the opposite sides of said prism.

3. An optical viewing device for diverting the direct vision field for personal attachment to the head of the wearer, comprising a visor embodying a top wall and a front wall and open at the bottom, a mounting under and adjacent the top wall of said visor, means attaching said mounting to and under said visor, two 3-faced, reflecting prisms of transparent material located below said mounting, said visor top wall and front wall extending respectively over and in front of said prisms, said visor shielding said prisms from external light at the top and front, and a retainer attached to and covering opposite sides of each said prism and embodying two flanges that slidably extend over two edges of said mounting whereby said prisms are slidably mounted on said mounting, said retainer embodying means holding said prisms on said mounting.

4. An optical viewing device for diverting the direct vision field for personal attachment to the head of the wearer, comprising a visor embodying a top wall and a front wall and open at the bottom, a mounting under and adjacent the top wall of said visor, means attaching said mounting to and under said visor, two 3-faced, reflecting prisms of transparent material located below said mounting, said visor top wall and front wall extending respectively over and in front of said prisms, said visor shielding said prisms from external light at the top and front, and a retainer attached to and covering opposite sides of each said prism and embodying a top on a said prism having two flanges that slidably extend over front and rear edges of said mounting whereby said prisms are slidably mounted on said mounting, said retainer embodying means holding said prisms on said mounting.

5. An optical viewing device for diverting the direct vision field for personal attachment to the head of the wearer, comprising a visor embodying a top wall and a front wall and open at the bottom, a mounting under and adjacent the top wall of said visor, means attaching said mounting to and under said visor, two 3-faced, reflecting prisms of transparent material located below said mounting, said visor top wall and front wall extending respectively over and in front of said prisms, said visor shielding said prisms from external light at the top and front, and a retainer attached to and covering opposite sides of each said prism and embodying a cover plate and a top plate covering each side and a top respectively of a said prism and two flanges extending from said top plate laterally between said cover plates and slidably extending over the front and rear edges of said mounting whereby said prisms are slidably mounted on said mounting, said retainer embodying means holding said prisms on said mounting.

6. An optical device for diverting the direct vision field for personal attachment to the head of the wearer, comprising a visor embodying a top wall, a front wall and two side walls which are integral, and being open at the bottom, a flat plate mounting directly below said top wall and having ears at opposite sides extending angularly from adjoining portions of said mounting, pin members attaching said ears to said visor sides, a nose piece embodying an attaching finger extending above and being attached to an intermediate portion of said mounting, said nose piece extending rearwardly of said mounting, two 3-faced prisms of transparent material at opposite sides of and spaced laterally from said nose piece and located directly below said mounting, and a retainer for each side of said prism embodying cover plates covering each side of a said prism, a flange extending therefrom that extends over and embraces a rear edge of a said prism, another flange that extends over and embraces a bottom edge of a said prism and an attaching wing extending upwardly at an angle from a said cover plate and being attached to the face of said mounting.

7. An optical viewing device for diverting the direct vision field for personal attachment to the head of the wearer, comprising a visor embodying a top wall, a front wall and two side walls which are integral, and being open at the bottom, a mounting directly below and adjacent said visor top wall and having ears at opposite sides extending angularly from adjoining portions of said mounting, means attaching said ears to said visor sides, a nose piece attached to said mounting and extending rearwardly of said mounting, two 3-faced, reflecting prisms of transparent material directly below said visor top wall and directly rearward of said visor front wall and at opposite sides of and spaced laterally from said nose piece and located directly below said mounting, said visor shielding said prisms from external light at the top and front, and retainers embodying cover plates covering opposite sides of each said prism and embodying flanges extending therefrom over and embracing edges of each said prism, and attaching wings extending at an angle from each said cover plate and being attached to said mounting.

8. An optical viewing device for diverting the direct vision field for personal attachment to the head of the wearer, comprising a visor embodying a top wall, a front and two downwardly depending side walls, and being open at the bottom and at the rear, a 3-faced, reflecting prism of transparent material directly below said visor top wall and directly rearward of said visor front wall and spaced from said side walls, the entrance face of said prism being directed generally to said open bottom and the exit face being directed generally to said open rear, said visor shielding said prism from external light at the top and front and sides, and means attaching said prism to said visor.

ROBERT P. EVANS.

REFERENCES CITED

The following references are of record in the file of this patent:

UNITED STATES PATENTS

| Number | Name | Date |
| --- | --- | --- |
| 1,027,576 | Victor | May 26, 1912 |
| 2,123,682 | Wingate | July 12, 1938 |
| 2,211,480 | Ring | Aug. 13, 1940 |